(12) United States Patent
Hirooka et al.

(10) Patent No.: US 10,536,625 B2
(45) Date of Patent: Jan. 14, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Shigeki Hirooka, Kawasaki (JP); Satoru Mamiya, Yokohama (JP); Sammy Chan, Beecroft (AU)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 15/832,492

(22) Filed: Dec. 5, 2017

(65) Prior Publication Data

US 2018/0167552 A1 Jun. 14, 2018

(30) Foreign Application Priority Data

Dec. 9, 2016 (JP) ................. 2016-239740

(51) Int. Cl.
*H04N 5/232* (2006.01)
*H04N 5/77* (2006.01)
*G06K 9/03* (2006.01)
*G06K 9/00* (2006.01)

(52) U.S. Cl.
CPC ..... *H04N 5/23219* (2013.01); *G06K 9/00228* (2013.01); *G06K 9/00845* (2013.01); *G06K 9/03* (2013.01); *H04N 5/772* (2013.01); *G06K 9/0061* (2013.01)

(58) Field of Classification Search
CPC ...... H04N 5/23219; H04N 5/232; H04N 5/76; H04N 5/772; H04N 5/91; G06K 9/00664; G06K 9/00228; G06K 9/00744; G06K 9/00845; G06K 9/03; G06K 9/036; G06K 9/0061
See application file for complete search history.

(56) References Cited

U.S. PATENT DOCUMENTS

2009/0148058 A1* 6/2009 Dane ............... H04N 5/145
382/251
2015/0363635 A1* 12/2015 Suri ................ G06K 9/00268
386/241

FOREIGN PATENT DOCUMENTS

JP 2009-527983 A 7/2009

* cited by examiner

*Primary Examiner* — Leon Flores
(74) *Attorney, Agent, or Firm* — Canon U.S.A., Inc. IP Division (57) ABSTRACT

When a first frame included in a moving image satisfies a predetermined condition about a predetermined feature quantity, a second frame is analyzed and a candidate frame is selected from the first frame and the second frame as a candidate of an output target based on a result of analysis of the first frame and a result of analysis of the second frame.

20 Claims, 9 Drawing Sheets

| FRAME NUMBER | EVALUATION SCORE | CLOSED-EYES FEATURE QUANTITY | DEFOCUSED STATE/SHAKING FEATURE QUANTITY | ... |
|---|---|---|---|---|
| 1 | 0.66 | 0.00 | 0.68 | ... |
| 31 | 0.46 | 0.00 | 0.15 | ... |
| 61 | 0.72 | 0.80 | 0.18 | ... |
| 91 | 0.74 | 0.00 | 0.47 | ... |

FIG. 3B

| FRAME NUMBER | EVALUATION SCORE |
|---|---|
| 4 | 0.86 |
| 31 | 0.46 |
| 61 | 0.72 |
| 91 | 0.74 |

| FRAME NUMBER | EVALUATION SCORE |
|---|---|
| 4 | 0.86 |
| 31 | 0.46 |
| 68 | 0.97 |
| 91 | 0.74 |

FIG. 9

FIG. 10

IMAGE PROCESSING APPARATUS, IMAGE PROCESSING METHOD, AND STORAGE MEDIUM

BACKGROUND OF THE INVENTION

Field of the Invention

The present disclosure relates to an image processing apparatus, an image processing method, and a storage medium for selecting a frame of a candidate of an output target from a moving image.

Description of the Related Art

A technology for selecting a specific frame from a plurality of frames included in moving image data and generating still image data of the selected frame has been proposed. For example, several still images suitable for appreciation are automatically generated from a moving image. In this case, the frames are evaluated based on image quality, for example, and highly evaluated frames are selected. If many frames included in the moving image data are analyzed and evaluated, processing load increases. To reduce processing time, some of the frames selected by sampling, for example, may be decoded and analyzed.

However, when only some of the frames are analyzed and evaluated, although those frames are highly evaluated among other analyzed frames, those frames are not necessarily suitable as still images for appreciation.

In the technology described in PCT Japanese Translation Patent Publication No. 2009-527983, whether expression of a face included in an analyzed frame looks happy is determined. If it is determined that the expression does not look happy, that frame is not saved and a frame delayed from that frame in the moving image is saved.

However, as described in PCT Japanese Translation Patent Publication No. 2009-527983, there is a case in which a frame delayed from the original analyzed frame is less suitable than the original frame. That is, there is a case in which a less suitable frame is selected by selecting a frame delayed from the original frame instead of selecting the original frame.

SUMMARY OF THE INVENTION

The present disclosure provides a technology to select a more suitable frame when selecting a frame of a candidate of an output target from a moving image, while reducing the number of frames of analysis targets.

An aspect of an exemplary embodiment is a program for selecting a frame of a candidate of an output target from a moving image, which includes an analysis unit configured to analyze frames included in the moving image, wherein the program causes a computer to function as a selection unit configured to select a candidate frame as the candidate of the output target based on a result of analysis by the analysis unit, when the first frame satisfies a predetermined condition about a predetermined feature quantity, the analysis unit analyzes a second frame in addition to the first frame, the selection unit selects the candidate frame from the first frame and the second frame based on a result of analysis by the analysis unit of the first frame and a result of analysis by the analysis unit of the second frame, and when the first frame does not satisfy the predetermined condition, the analysis unit does not analyze the second frame, and the selection unit selects the first frame as the candidate frame.

Further features of the present invention will become apparent from the following description of exemplary embodiments with reference to the attached drawings.

DESCRIPTION OF THE EMBODIMENTS

Hereinafter, embodiments of the present disclosure will be described in detail with reference to the attached drawings. Configurations described in the following embodiments are illustrative only and not restrictive.

First Embodiment

Figure 1:
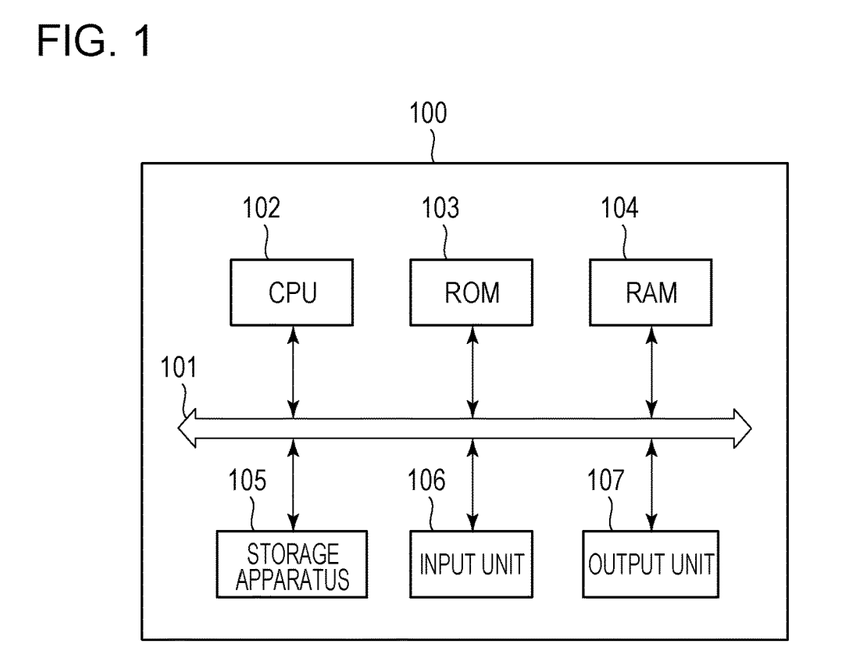
FIG. 1 is a block diagram illustrating an example of a hardware configuration of an image processing apparatus of a first embodiment.

FIG. 1 is a block diagram illustrating an example of a hardware configuration of an image processing apparatus which selects a frame of an output target from a moving image in the present embodiment.

In FIG. 1, the reference numeral 100 denotes the entire hardware of the image processing apparatus. The reference numeral 102 denotes a central processing unit (CPU). The CPU 102 performs calculation and logical decision for later-described various processes, and controls each constituent element connected to a system bus 101 on which data and instructions are transmitted and received. The reference numeral 105 denotes a storage apparatus, such as a hard disk, for storing moving image data and still image data extracted from the moving image data, and a program in the present embodiment. The reference numeral 106 denotes an input unit, such as a mouse, a keyboard, and a tablet, with which a user inputs or operates data. The reference numeral 107 denotes an output unit, such as a display, including a circuit for outputting, such as a graphic controller.

Program memory and data memory are mounted on the image processing apparatus 100. A program for executing each process illustrated in the later-described flowchart is stored in the program memory. The process illustrated in each of the later-described flowcharts is executed when the CPU 102 executes the program stored in the program memory on the data memory. The program memory may be ROM 103 or the storage apparatus 105.

Figure 2:
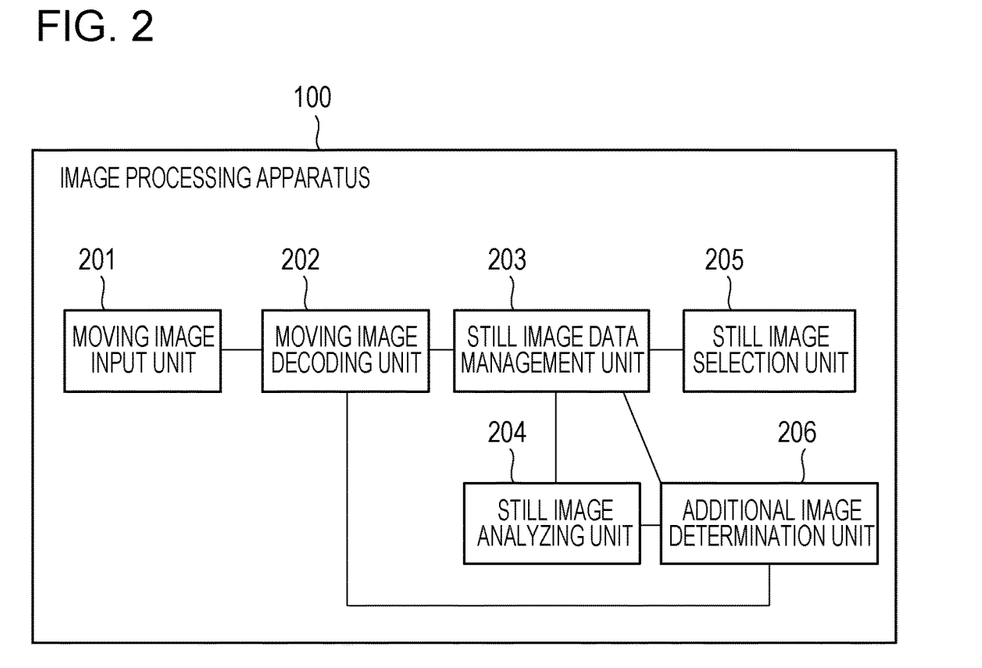
FIG. 2 is a block diagram illustrating an example of a functional configuration of the image processing apparatus of the first embodiment.

FIG. 2 is a block diagram illustrating an example of a functional configuration of the image processing apparatus 100 in the present embodiment. The CPU 102 executes the program in the program memory and thus operates as each of the functional configurations illustrated in FIG. 2.

The reference numeral 201 denotes a moving image input unit into which moving image data is input. The reference numeral 202 denotes a moving image decoding unit for decoding a specified frame from moving image data input by the moving image input unit 201, and generating still image data. The reference numeral 203 denotes a still image data management unit which manages the still image data generated by the moving image decoding unit 202 and a feature quantity of the still image data. The still image data management unit 203 manages two tables illustrated in FIGS. 3A and 3B later. These two tables are stored in the RAM 104, for example, and is managed in the RAM 104.

The reference numeral 204 denotes a still image analyzing unit for analyzing various kinds of feature quantities of the still image data (frames) generated by the moving image decoding unit 202, and evaluating the still image data (frames). The reference numeral 205 denotes a still image selection unit which selects still image data (frame) of a candidate of an output target depending on evaluation by the still image analyzing unit 204. The reference numeral 206 denotes an additional image determination unit which determines still image data (frame) to be additionally analyzed based on an analysis result and evaluation of the still image data (frame) by the still image analyzing unit 204.

In the present embodiment, if a new, second frame is determined by the additional image determination unit 206 as a result of analysis and evaluation by the still image analyzing unit 204 about a first frame, for example, the still image analyzing unit 204 also analyzes and evaluates the second frame. Between the first frame and the second frame, the still image data management unit 203 selects a frame with a higher evaluation value as a candidate of an output target. Therefore, if the first frame is higher in evaluation than the second frame, the first frame is selected as a candidate of the output target. Details of the selection process of the still image data (frame) of the present embodiment will be described later.

Figure 3A:
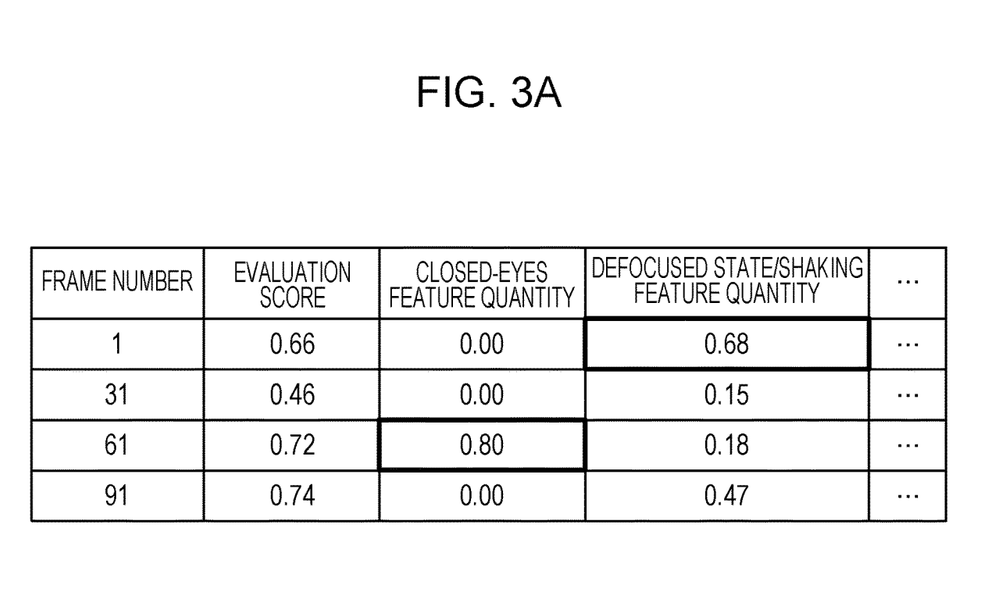
FIGS. 3A and 3B illustrate examples of tables stored in the image processing apparatus of the first embodiment.
Figure 3B:
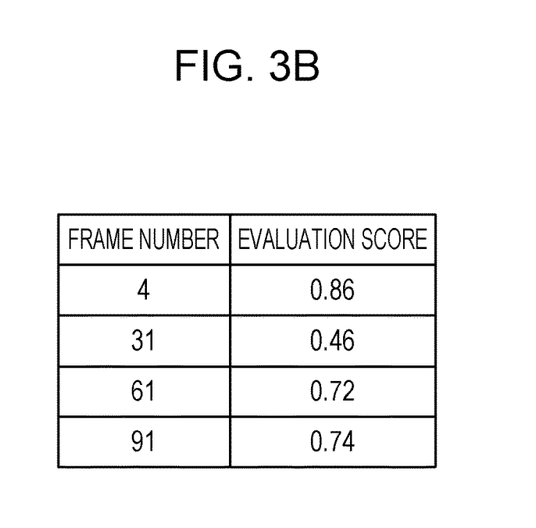

FIGS. 3A and 3B illustrate examples of tables stored in the image processing apparatus 100. The tables illustrated in FIGS. 3A and 3B are stored in the RAM 104 by the CPU 102, for example.

FIG. 3A is a table showing a list of still images decoded by the moving image decoding unit 202 and analyzed and evaluated by the still image analyzing unit 204. In the example of FIG. 3A, the moving image decoding unit 202 decodes every 30 frames about a plurality of frames included in the moving image input into the moving image input unit 201. In the table illustrated in FIG. 3A, each row represents a single decoded still image. In a piece of still image data in the table illustrated in FIG. 3A, the leftmost column represents a frame number of a corresponding frame in the moving image, and the second column from the left represents an evaluation score of the still image. The third and the subsequent columns from the left represent feature quantities of analysis result of the still image. Each feature quantity is normalized to the minimum value of 0 and the maximum value of 1 during the analysis. In FIG. 3A, a "closed-eyes feature quantity" indicates a degree to which a person included in an image closes the eyes. As the degree to which a person closes the eyes becomes higher, the closed-eyes feature quantity increases. A "defocused state/shaking feature quantity" indicates a degree of defocusing or shaking of an image. As the degree of defocusing or shaking becomes higher, the "defocused state/shaking feature quantity" increases. The degree to which a person closes the eyes and the degree of defocusing or shaking may be calculated by various publicly known methods.

In FIG. 3A, the "closed-eyes feature quantity" and the "defocused state/shaking feature quantity" are illustrated as feature quantities, however, other feature quantities, such as image quality, like exposure and saturation of a still image, and the type, position, size, and expression of an object, may be calculated and normalized, and may be included in the table illustrated in FIG. 3A. However, specific values of these other feature quantities are not illustrated in FIG. 3A.

The "evaluation score" illustrated in FIG. 3A indicates evaluation calculated by the still image analyzing unit 204 based on each feature quantity of the still image corresponding to each row. As the "closed-eyes feature quantity" and the "defocused state/shaking feature quantity" increases, the "evaluation score" decreases. That is, if a certain still image is not suitable as an output target, a larger value will be provided to the still image as the feature quantity. Regarding feature quantities other than the "closed-eyes feature quantity" and the "defocused state/shaking feature quantity," greater values will be provided as feature quantities if these feature quantities are not suitable as output targets. Various kinds of methods may be used for calculating the "evaluation score." FIG. 3B is a table showing a list of still images as candidates of output targets (candidate frames). The still image selection unit 205 selects a still image of an output target from the still images illustrated in the table of FIG. 3B. In the table of FIG. 3B, each row represents a single decoded still image. In a piece of still image data in the table, the left column represents a frame number of a corresponding frame of a moving image, and the right column represents an evaluation score of the still image. That is, data on the left two columns in the table illustrated in FIG. 3A correspond to the table in FIG. 3B.

As described later, among a plurality of frames to which the table illustrated in FIG. 3A corresponds, about frames (original frames) of which "closed-eyes feature quantity" or "defocused state/shaking feature quantity" is high, a frame as a new analysis target is determined by the additional image determination unit 206. The still image analyzing unit 204 then analyzes and evaluates various feature quantities about the new frame determined by the additional image determination unit 206. The still image data management unit 203 causes a frame with a higher evaluation score between the original frame and the new frame to be included in the table illustrated in FIG. 3B as a selection candidate. For example, in FIG. 3B, the frame of the frame number "4" having a higher evaluation score than that of the frame of the frame number "1" is included in the table as the selection candidate instead of the frame of the frame number "1" illustrated in FIG. 3A.

Figure 4:
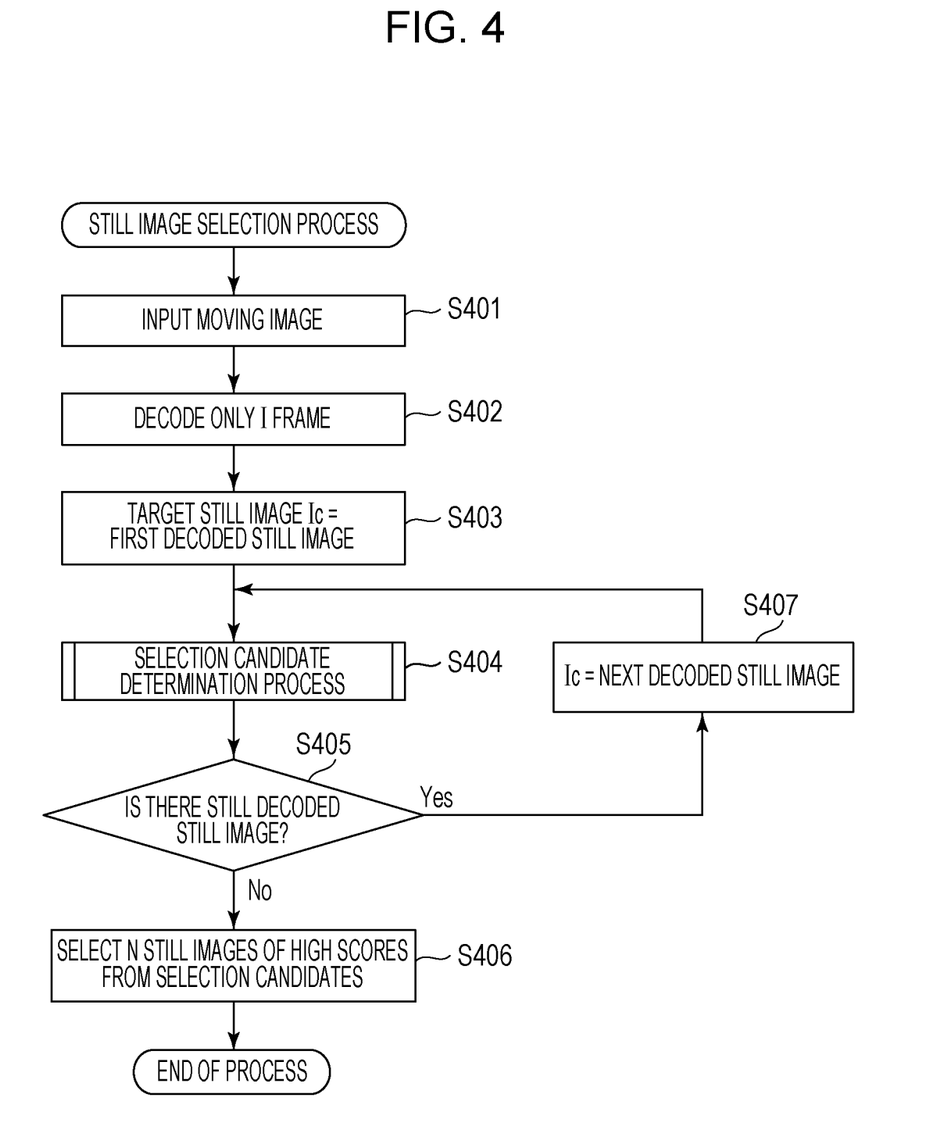
FIG. 4 is a flowchart illustrating an example of a selection process of a still image in the first embodiment.

FIG. 4 is a flowchart illustrating an example of a process in which the image processing apparatus 100 of the present embodiment selects the still image. Each process illustrated in the flowchart in FIG. 4 is implemented when the CPU 102 executes a program stored in the program memory on the data memory, and the CPU 102 functions as each element illustrated in FIG. 2. In the following description, each element illustrated in FIG. 2 shall perform each of the processes illustrated in the flowchart of FIG. 4.

The moving image input unit 201 acquires a moving image from an apparatus or memory outside of the image processing apparatus 100, or memory inside of the storage apparatus 105, and so forth (S401). A still image of an output target is selected from the moving image. The format of the moving image input in S401 is the MPEG form. The moving image includes P frames (Predicted Frames) and B frames (Bi-directed Predicted Frames) which are encoded by inter frame prediction. The moving image also includes I frames (Intra Frames) compressed as a still image without using inter frame prediction.

The moving image decoding unit 202 generates a still image by specifying and decoding an I frame and not decoding a P frame and a B frame of the moving image acquired in S401, and stores the generated still image in the storage apparatus 105 (S402). Since no inter frame prediction is used to encode the I frame, the decoding process of the I frame does not need to decode other frames like the decoding process of the P frame or the B frame. Therefore, a processing volume of the decoding process of the I frame is smaller than the decoding process of the P frame or the B frame, which can increase the speed of the process. Since no inter frame prediction is used in the I frame, the I frame may be higher in image quality than the P frame or the B frame. Therefore, the moving image decoding unit 202 decodes the I frame as a selection candidate of an output target. Since the P frame and the B frame are not decoded in S402, processing time for decoding the frame is shortened compared with a case in which all the frames are decoded.

In S402, the moving image decoding unit 202 provides the decoded still image with a filename in accordance with a filename of the moving image and the frame number, and stores the still image in the storage apparatus 105. Therefore, the still image becomes identifiable.

Next, the still image data management unit 203 reads the temporarily first still image in the moving image input in S401 among a plurality of still images (a plurality of I frames) generated in S402 into the RAM 104 as a current target still image Ic (S403). The still image data management unit 203 then determines a still image to be held in the table illustrated in FIG. 3B by a later-described selection candidate determination process with reference to FIG. 5 (S404).

Next, the still image data management unit 203 determines whether a still image which is stored in S402 and for which a selection candidate determination process has not been executed in S404 is stored in the storage apparatus 105 (S405). If it is determined in S405 that the above-described still image is stored in the storage apparatus 105, the still image data management unit 203 reads the temporarily first still image among those still images into the RAM 104 as the current target still image Ic (S407). In S404, the still image data management unit 203 performs a selection candidate determination process about the still image read in S407. If it is determined in S405 that the above-described still image is not stored in the storage apparatus 105, the process proceeds to S406. The still image selection unit 205 selects a frame of an output target from candidate frames which are determined by the selection candidate determination process, and are candidates of the output targets included in the table illustrated in FIG. 3B (S406). Specifically, the still image selection unit 205 selects a predetermined number of still images with high evaluation scores in S406.

Figure 5:
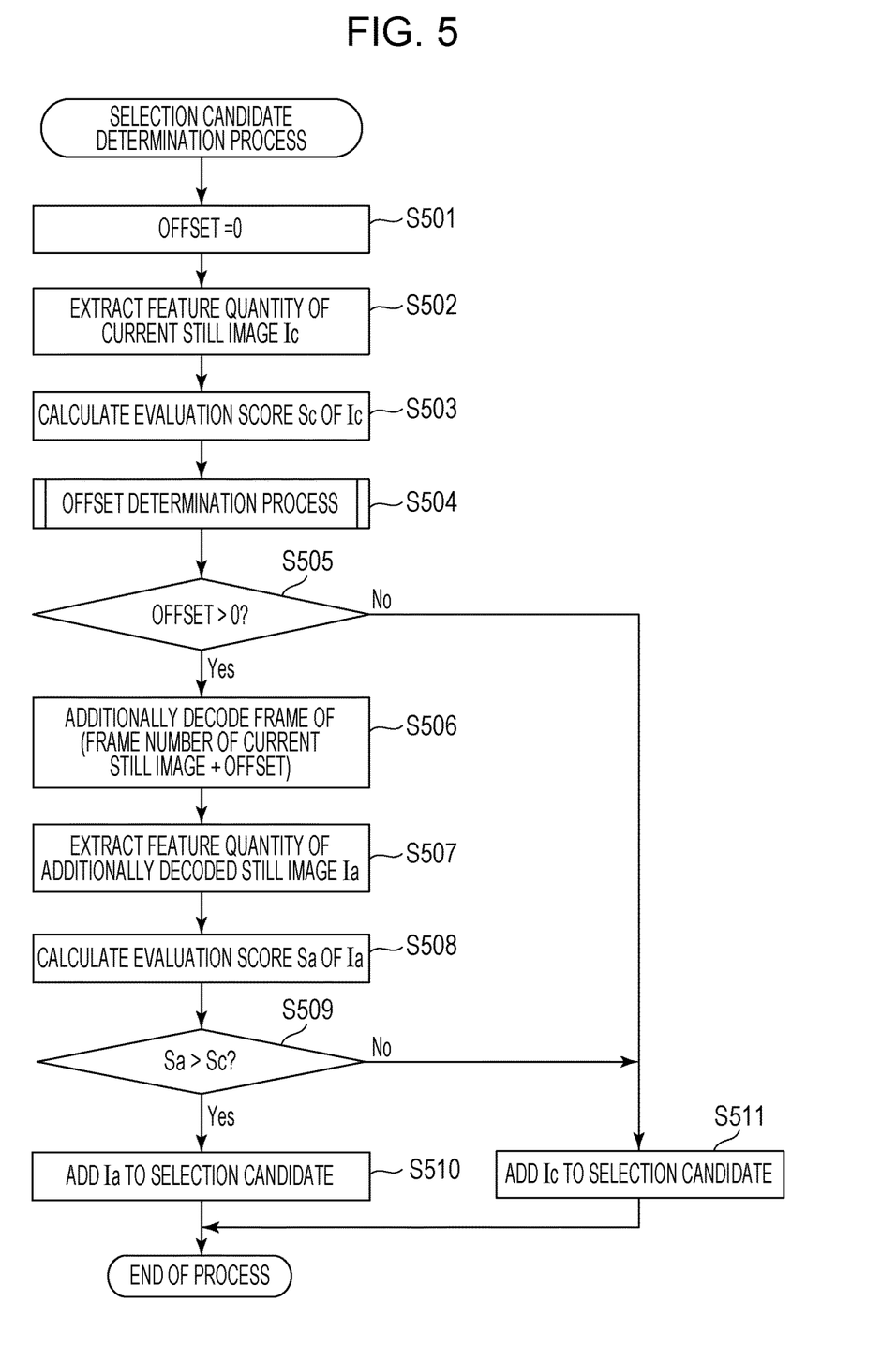
FIG. 5 is a flowchart illustrating an example of a selection candidate determination process.

FIG. 5 is a flowchart illustrating an example of the selection candidate determination process in the present embodiment, and illustrating details of S404 of FIG. 4.

The still image data management unit 203 initializes an offset to 0 (S501). The offset indicates the number of frames from the frame corresponding to the current target still image Ic to a frame to be additionally decoded. Next, the still image analyzing unit 204 extracts each feature quantity of the still image Ic (S502), and calculates an evaluation score Sc of the still image Ic based on the feature quantity (S503). Further, the still image data management unit 203 stores the feature quantity extracted in S502 and the evaluation score Sc calculated in S503 in the table illustrated in FIG. 3A in association with the frame number of the still image Ic. Here, the evaluation score is calculated by integrating values suitably weighed on the feature quantities, such as image quality, like exposure and saturation of a still image, and the type, position, size, and expression of and object in addition to the closed-eyes feature quantity and the defocused state/shaking feature quantity illustrated in the table of FIG. 3A. In the case of the feature quantities which negatively affect the evaluation of the still image like the closed-eyes feature quantity and the defocused state/shaking feature quantity mentioned in the present embodiment, the weight becomes a negative value.

The additional image determination unit 206 performs an offset determination process to determine an offset representing a later-described addition analysis image in detail in FIG. 6 (S504). By the offset determination process in S504, the additional image determination unit 206 determines an offset value which is the number of frames from the still image Ic to the frame corresponding to the still image to be additionally analyzed in the moving image input in S401.

Next, the still image data management unit 203 determines whether the offset determined in S504 is larger than 0, i.e., whether it is necessary to additionally decode and analyze the still image (S505). If it is determined in S505 that the offset is not larger than 0, it is determined that it is not necessary to additionally decode and analyze the still image, and the process proceeds to S511.

If it is determined in S505 that the offset is larger than 0, the process proceeds to S506. The moving image decoding unit 202 specifies a frame of a number in which an offset is added to a frame number of a frame corresponding to the current still image Ic in the moving image input in S401, and additionally decodes the specified frame (S506). The frame to be decoded in S506 is a frame of a specified frame number, and may be a P frame or a B frame in addition to an I frame. The still image analyzing unit 204 extracts a feature quantity of an additional still image Ia generated by additional decoding in S506 (S507). The evaluation score Sa of the additional still image Ia is then calculated by the same process as in S503 (S508).

The still image data management unit 203 determines whether the evaluation score Sa of the additional still image Ia is larger than the evaluation score Sc of the still image Ic (S509). If Sa is determined to be larger than Sc, the process proceeds to S510. The still image data management unit 203 adds the frame number and the evaluation score Sa corresponding to the additional still image Ia to the table showing the still image list of the selection candidates illustrated in FIG. 3B (S510), and completes the process. With the process in S510, the frame corresponding to the still image Ia is selected as the candidate frame which is the candidate of the output target. If Sa is determined in S509 not to be larger than Sc, the still image data management unit 203 adds the frame number and the evaluation score Sc corresponding to the still image Ic to the table showing the still image list of the selection candidates illustrated in FIG. 3B (S511), and completes the process. With the process in S511, the frame corresponding to the still image Ic is selected as the candidate frame which is the candidate of the output target.

Figure 6:
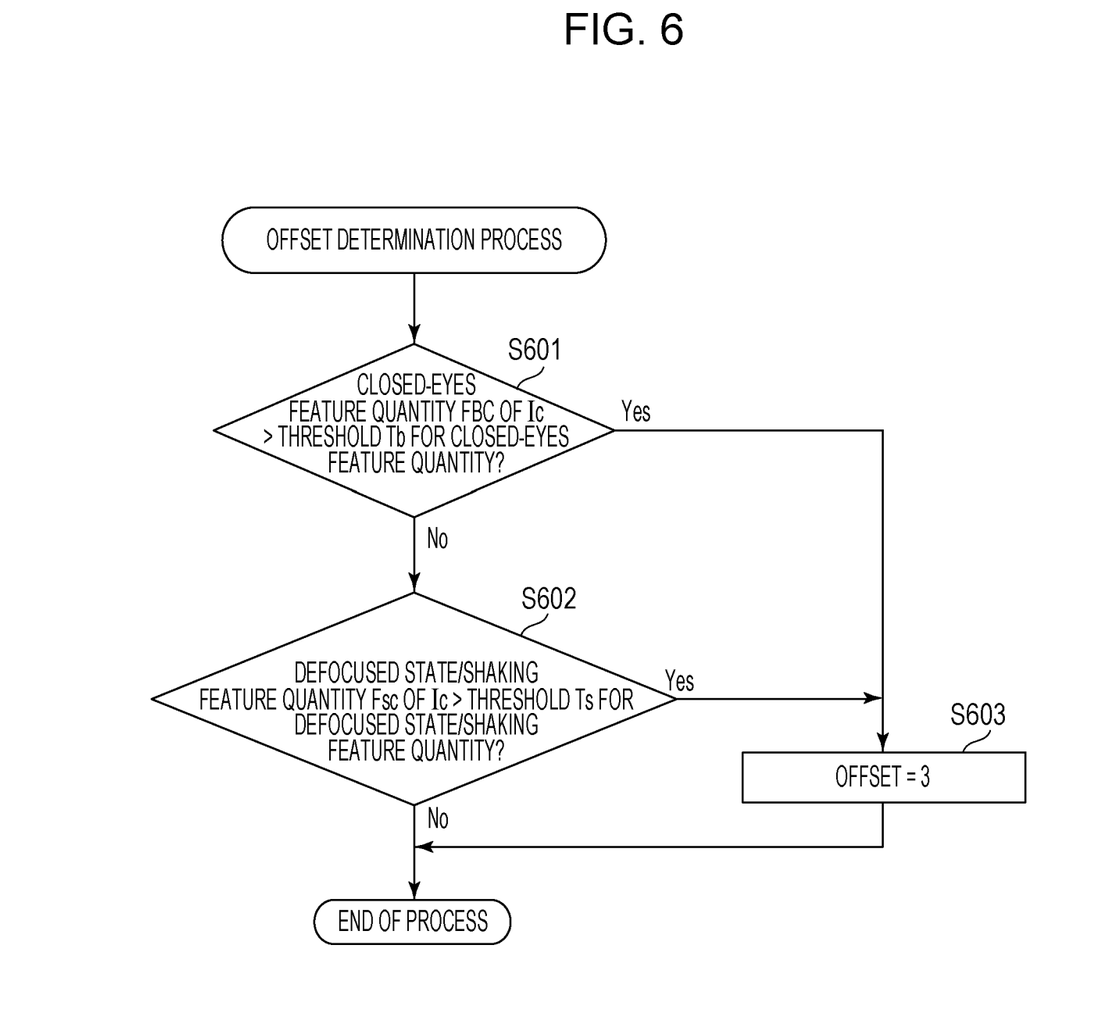
FIG. 6 is a flowchart illustrating an offset determination process of determining an offset to an additional analysis image in the first embodiment.

FIG. 6 is a flowchart illustrating an offset determination process in the first embodiment to determine an offset to an additional analysis image, and illustrating details of S504 of FIG. 5.

The additional image determination unit 206 specifies a closed-eyes feature quantity Fbc as a predetermined feature quantity of the current target still image Ic in the table illustrated in FIG. 3A, and determines whether the specified closed-eyes feature quantity Fbc has exceeded a threshold Tb for the closed-eyes feature quantity (S601). If it is determined in S601 that the closed-eyes feature quantity Fbc has not exceeded the threshold Tb, the process proceeds to S602. If it is determined that the closed-eyes feature quantity Fbc has exceeded the threshold Tb, the still image Ic is considered as a still image which satisfies a predetermined condition that other frames need to be additionally analyzed and evaluated about the closed-eyes feature quantity, and the process proceeds to S603.

The additional image determination unit 206 specifies a defocused state/shaking feature quantity Fsc of the still image Ic as the predetermined feature quantity in the table illustrated in FIG. 3A, and determines whether the specified defocused state/shaking feature quantity Fsc has exceeded a threshold Ts for the defocused state/shaking feature quantity (S602). If it is determined that the defocused state/shaking feature quantity Fsc has not exceeded the threshold Ts, the additional image determination unit 206 completes the process illustrated in FIG. 6. If it is determined that the defocused state/shaking feature quantity Fsc has exceeded the threshold Ts, the still image Ic is considered as a still image which satisfies a predetermined condition that other frames need to be additionally analyzed and evaluated about the defocused state/shaking feature quantity, and the process proceeds to S603.

In S603, the additional image determination unit 206 determines an offset for specifying the frame as a target to be additionally analyzed as 3. That is, according to the process illustrated in FIG. 6, if either of the condition that the closed-eyes feature quantity Fbc has exceeded the threshold Tb or the condition that the defocused state/shaking feature quantity Fsc has exceeded the threshold Ts, etc. is satisfied, the offset will be updated from 0 to 3. That is, by the processes of S506 to S508, the frame is additionally decoded, analyzed, and evaluated, and the evaluation scores of the frame and the current target still image Ic (I frame) are compared in S509.

The process illustrated in FIG. 6 will be described in detail using the table illustrated in FIG. 3A. For example, if the threshold Ts for the defocused state/shaking feature quantity is "0.5," it is determined in S602 that the defocused state/shaking feature quantity Fsc of the still image Ic corresponding to the frame number "1" (the I frame) has exceeded the Ts. Therefore, in the process of S603, the offset is set to 3. As a result, it is determined that the offset is larger than 0 in S505 of FIG. 5. Therefore, in S506, a fourth frame (the frame number "1" to which the offset "3" is added) among a plurality of frames included in the moving image is additionally decoded, and the still image is generated and stored. Then the feature quantity of the still image is extracted in S507, and the evaluation score Sa is calculated in S508. For example, if the evaluation score Sa is 0.86, since the evaluation score Sa is higher than the evaluation score Sc, the frame number "4" and its evaluation value 0.86 will be stored in the table showing the still image list of the selection candidates illustrated in FIG. 3B as a result of comparison of S509.

Similarly, since the still image Ic (the I frame) corresponding to the frame number "61" shown in the table of FIG. 3A has a closed-eyes feature quantity Fbc higher than the Tb (e.g., 0.6), the offset is set to 3 in S603. As a result, the offset is determined to be larger than 0 in S505, the 64th frame (the frame number "61" to which the offset "3" is added) is additionally decoded in S506, and the still image is generated and stored. Then the feature quantity of the still image is extracted in S507 and the evaluation score Sa is calculated in S508. Here, the evaluation score Sa is 0.68. As a result of the comparison of S509, since the evaluation score Sc (0.72) is higher than the evaluation score Sa, the frame number "61" and its evaluation value 0.72 are stored in the table showing the still image list of the selection candidates illustrated in FIG. 3B.

The still images corresponding to the frame numbers "31" and "91" shown in the table of FIG. 3A are small in both the closed-eyes feature quantity and the defocused state/shaking feature quantity, and are determined to be "No" both in S601 and S602 of FIG. 6. Therefore, the frame numbers "31" and "91" and the evaluation score of each of the still images corresponding to each frame number are stored in the table showing the still image list of the selection candidates illustrated in FIG. 3B.

As a result, in S406 of FIG. 4, the still image selection unit 205 selects a still image with a higher evaluation score from the table showing the still image list of the selection candidates illustrated in FIG. 3B. For example, suppose that two still images are to be selected, still images of the frame numbers "4" and "91" will be selected.

According to the image processing apparatus 100 of the above embodiment, some of the frames among a plurality of frames included in the moving image will be decoded and analyzed. Specifically, the I frames will be decoded and analyzed. If it is determined as a result of analysis that closed-eyes, shaking, or a defocused state has occurred, the I frames will be additionally analyzed, and if no closed-eyes, shaking, or a defocused state has occurred, the I frames will not be additionally analyzed. When closed-eyes, shaking, or a defocused state has occurred in the I frames and it is better to refer to other frames, other frames will be additionally analyzed. Therefore, more suitable frames can be selected while reducing load of frame analysis compared with a case in which all the frames are analyzed.

Even if the frames are additionally analyzed, if the evaluation score of the current target still image Ic (I frame) is higher than that of the still image Ia of the additionally analyzed frame, the still image Ic becomes a selection candidate. Therefore, it can be prevented that the still image Ia with a lower evaluation score than that of the still image Ic becoming a selection candidate.

In the above embodiment, one frame is additionally decoded and analyzed when the value of the feature quantity is less than a threshold, however, a plurality of predetermined frames may be additionally decoded, analyzed and evaluated.

In the above embodiment, the image processing apparatus 100 may select the still image as a candidate of an output target for various purposes. For example, the image processing apparatus 100 may generate an electronic album by automatically arranging the still images on a template, and output the electronic album to an output device. For example, the image processing apparatus 100 may output data of the electronic album to a display device or a printing apparatus as an output device, and may execute displaying or printing. At this time, the above embodiment may be used when the image processing apparatus 100 automatically selects still images to be arranged on the template and displayed or printed as an electronic album from the moving image. In that case, many still images automatically selected from the moving image, for example, become candidates to be arranged on the template together with still images originally captured as still images. Then, images to be arranged may further be selected from the candidates to be arranged from the viewpoint of image quality, composition, etc., and the image processing apparatus 100 may arrange the selected images on the template.

For example, the number of slots (a region in which the still images are to be arranged) in the template may differ or the number of still images (frames) to be selected in S406 may differ depending on the number of pages of the electronic album. For example, if the number of slots and the number of pages of the electronic album is large, the number of the still images to be arranged on the template will be increased. Therefore, it is desirable that the number of still images of the candidates to be arranged is also large. Therefore, for example, if the total number of the slots in a plurality of pages of the electronic album is greater than a threshold, a greater number of still images may be selected in S406 compared with a case in which the total number is equal to or smaller than the threshold.

In the process illustrated in FIG. 4, the I frame is first extracted from the moving image, and a frame to be additionally analyzed is a P frame or a B frame. The P frame or the B frame, encoded by the inter frame prediction, often has lower image quality than that of the I frame. If image quality degradation by the inter frame prediction is not reflected on the analysis in the analysis of the still image analyzing unit 204, the evaluation score may be adjusted so that the score of the additionally analyzed P frame or B frame may be lowered.

In the embodiment described above, the evaluation score Sc of the current target still image Ic is compared with the evaluation score Sa of the additionally decoded still image Ia, and the still image with a higher evaluation score is selected. However, selection of the still images is not limited to the same. Both of the still image Ic and the still image Ia may be added to the table illustrated in FIG. 3B as the candidates of the output targets without performing the comparison described above.

Further, in the above embodiment, the process for determining whether to additionally perform analysis (S504, FIG. 6) and the process for selecting the candidate frame which is the candidate of the output target if the analysis is additionally performed (S509 to S511) are executed based on the common feature quantity. Specifically, the closed-eyes feature quantity and the defocused state/shaking feature quantity are considered in both of the two processes above. However, this is not restrictive and the two processes may be executed in consideration of individual feature quantities. For example, in the process of selecting the candidate frame which is the candidate of the output target (S509 to S511), the candidate frame may be selected in consideration of evaluation obtained by only using a result of analysis of a feature quantity other than the closed-eyes feature quantity and the defocused state/shaking feature quantity. The feature quantity other than the closed-eyes feature quantity and the defocused state/shaking feature quantity may be various feature quantities, such as the size of the face of a person in the image, the position of the face, and the number of faces, for example.

In order for the process for determining whether to additionally perform analysis, the evaluation score Sc of the still image Ic calculated in S503 is also used for the process for selecting a candidate frame which is a candidate of an output target (S509). However, this is not restrictive and in the process for selecting a candidate frame which is a candidate of an output target (S509), evaluation of the still image Ic may be newly performed in accordance with an evaluation basis different from that in S503. However, as illustrated in FIG. 5, by using the evaluation score Sc calculated in S503 also in S509, the process can be simplified.

In the process illustrated in FIG. 6, whether the additional image determination unit 206 determines a frame to be additionally analyzed is changed depending on whether the still image Ic satisfies the predetermined condition about the predetermined feature quantity. However, this is not restrictive and the additional image determination unit 206 may determine a frame to be additionally analyzed irrespective of whether the still image Ic satisfies the predetermined condition about the predetermined feature quantity. Then, whether the determined frame is to be analyzed by the still image analyzing unit 204 may be changed depending on whether the predetermined condition is satisfied.

Second Embodiment

In the first embodiment, the offset value for specifying the frame number of the frame to be additionally decoded and analyzed is fixed ("3" in FIG. 6) irrespective of the type of the feature quantity (the "closed-eyes feature quantity" and the "defocused state/shaking feature quantity" in FIG. 6). However, regarding a frame of which a value of a feature quantity has exceeded a predetermined threshold and therefore is not desirable as a still image of an output target, time (the number of frames) before the feature quantity becomes smaller than the threshold is not necessarily fixed. For example, time until a state in which a person of an object closes the eyes by blinking returns to a state in which the person opens the eyes and time until a defocused state (the defocused state/shaking feature quantity) becomes an in-focus state by auto-focusing are not necessarily the same. Then, in the second embodiment, a process to change the values of the offset depending on the type of the feature quantity which exceeds a predetermined threshold among a plurality of types of feature quantities will be described. In the second embodiment, processes other than an offset determination process for determining the offset to specify the frame number of the additional analysis image are the same as those of the first embodiment.

Figure 7:
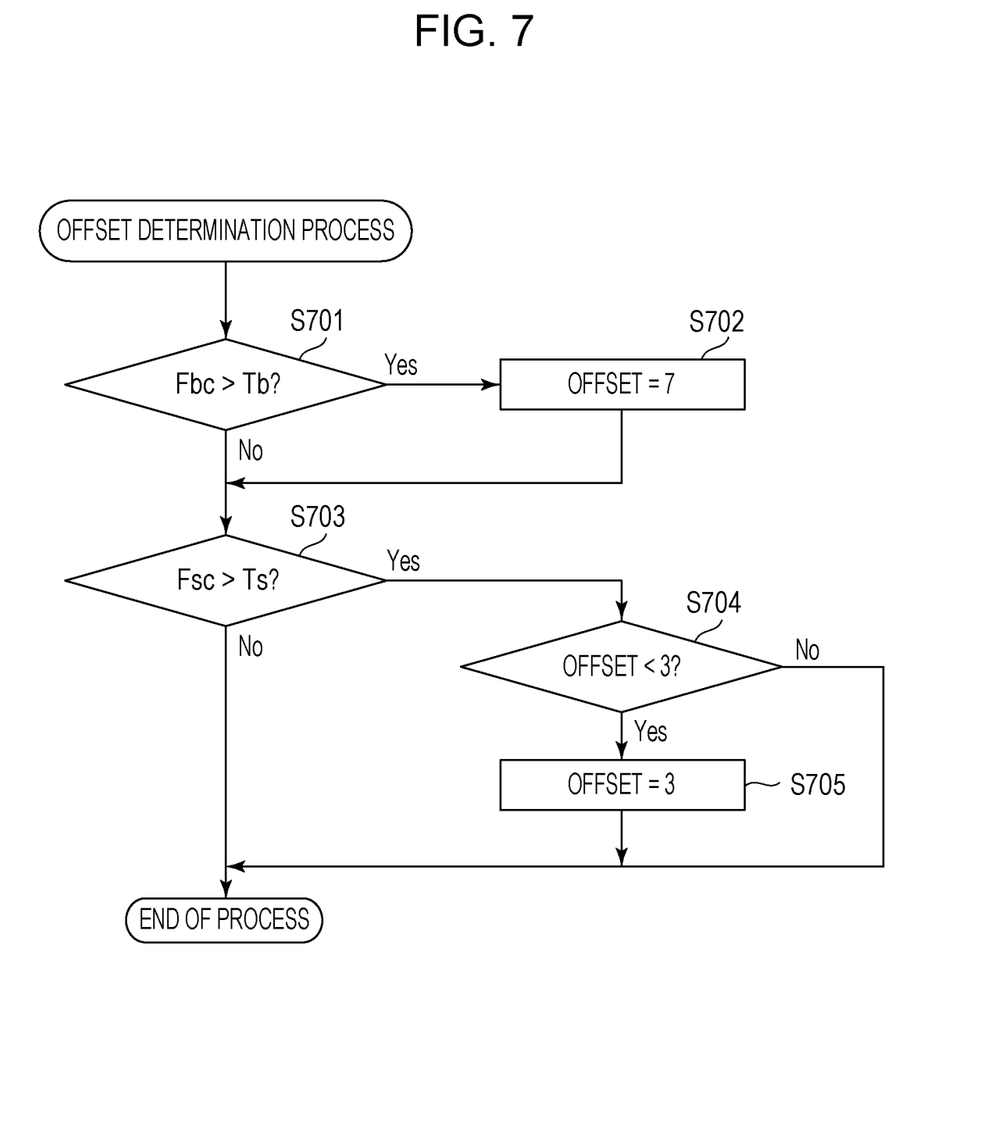
FIG. 7 is a flowchart illustrating an example of an offset determination process in a second embodiment.

FIG. 7 is a flowchart illustrating an example of the offset determination process in the second embodiment. In the second embodiment, a process illustrated in the flowchart of FIG. 7 is executed in S504 of FIG. 5.

The additional image determination unit 206 determines whether the closed-eyes feature quantity Fbc of the current target still image Ic has exceeded the above-described threshold Tb (S701). As a result of the determination of S701, if the closed-eyes feature quantity Fbc has exceeded the above-described threshold Tb, the additional image determination unit 206 sets the offset to 7 (S702). Next, the additional image determination unit 206 determines whether the defocused state/shaking feature quantity Fsc of the still image Ic has exceeded the above-described threshold Ts (S703), and if the defocused state/shaking feature quantity Fsc has not exceeded the threshold Ts, completes the process of FIG. 7.

If it is determined in S703 that the defocused state/shaking feature quantity Fsc has exceeded the above-described threshold Ts, it is determined whether the current offset is smaller than 3 (S704). If it is determined in S704 that the offset is smaller than 3, the additional image determination unit 206 sets the offset to 3 (S705). If it is determined in S704 that the offset is larger than 3, the additional image determination unit 206 completes the process of FIG. 7 without updating the offset. That is, if a degree of closed-eyes of a person of the object is high in the still image Ic and the offset is set to 7 in S702, the offset is not updated and the process of FIG. 7 is completed.

The process illustrated in FIG. 7 is a process in a case in which, for example, time required to eliminate the closed-eyes state (that is, time at which a person opens the eyes during blinking) is considered to be longer than time required to eliminate the defocused state and shaking. That is, if a closed-eyes state occurs, as compared with a case in which a defocused state or shaking occurs in the still image Ic, a frame with a longer frame interval from the still image Ic is specified as an additional analysis target. Therefore, a possibility that the closed-eyes state has not been eliminated because the frame interval (time) between the frame specified as an additional analysis target and the still image Ic is short can be reduced, for example.

Only the closed-eyes feature quantity and the defocused state/shaking feature quantity are determined in FIG. 7, however, the type of the feature quantity is not limited to the same. For example, there may be a feature quantity which needs determination in addition to the closed-eyes feature quantity and the defocused state/shaking feature quantity. If that feature quantity is equal to or greater than a threshold, suppose that a predetermined value different from the values when the closed-eyes feature quantity and the defocused state/shaking feature quantity are equal to or greater than a threshold is set as an offset. In this case, a process corresponding to S703 to S705 is added before "end of process" in FIG. 7. In the process corresponding to S704 and S705, not "3" but the predetermined value described above is used as an offset value. Since the process is added as described above, even if various feature quantities are added as feature quantities of determination targets, a maximum value among the offset values corresponding to the feature quantities equal to or greater than a threshold is set to the final offset value set by the process of FIG. 7.

Figure 8:
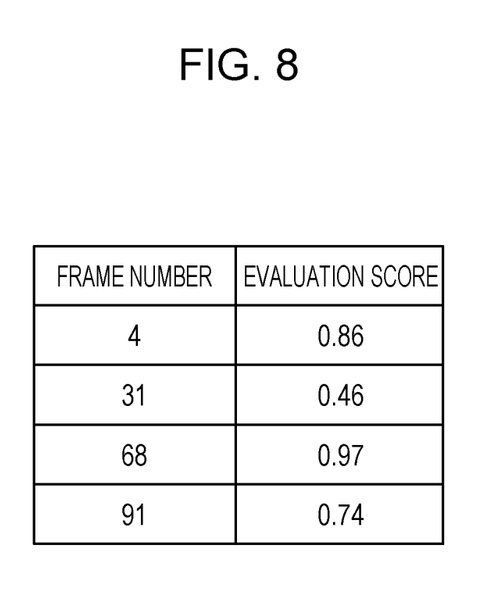
FIG. 8 illustrates an example of a table stored in an image processing apparatus in the second embodiment.

FIG. 8 illustrates an example of a table stored in the image processing apparatus in the second embodiment, and the table shows a still image list of selection candidates. The table illustrated in FIG. 8 shows the same contents as those of the table illustrated in FIG. 3B, and is stored in RAM 104 by the CPU 102, for example.

In the table illustrated in FIG. 8, each row represents a single still image decoded from a moving image. In a single piece of still image data in the table, the left column indicates a frame number of a frame corresponding to the moving image, and the right column indicates an evaluation score of the still image.

In the second embodiment, since the still image corresponding to the frame number "1" stored in the 1st row of FIG. 3A has a lower defocused state/shaking feature quantity Fbc than Tb (e.g., 0.6) in the determination of S701, the offset is still 0. On the other hand, since the closed-eyes feature quantity Fsc is higher than Ts (e.g., 0.5) in the determination of S703, determination of S704 is performed. Since the offset value is 0 at this time, the process proceeds to S705 as a result of the determination of S704, and the offset is set to 3 in S705. As a result, since the offset is larger than 0 as a result of the determination of S505, a frame of the frame number is "4" (the frame number "1" to which the offset "3" is added) is additionally decoded in S506, and the still image Ia is generated and stored. Then, the feature quantity of the still image Ia is extracted in S507, and the evaluation score Sa is calculated in S508. Here, Sa should be 0.86. Then, as a result of comparison of S509, since the evaluation score Sa (0.86) is higher than the evaluation score Sc (0.66), the frame number "4" and its evaluation value 0.86 are stored in the table illustrated in FIG. 8.

Similarly, since the still image corresponding to the frame number "61" stored in the 3rd row of FIG. 3A has a closed-eyes feature quantity Fbc exceeding Tb (0.6) in the determination of S701, the offset is set to 7 in S702. Since the shaking defocused state feature quantity Fsc is determined to be lower than Ts (0.5) in the subsequent determination of S703, the offset is still 7. As a result, since the offset is larger than 0 in the determination of S505, the frame of the frame number "68" (the frame number "61" to which the offset "7" is added) is additionally decoded in S506, and the still image Ia is generated and stored. Then, the feature quantity of the still image Ia is extracted in S507, and the evaluation score Sa is calculated in S508. Here, the evaluation score Sa should be 0.97. Next, the evaluation score Sa and the evaluation score Sc are compared in S509. As a result of the comparison, since the evaluation score Sa is higher than the evaluation score Sc, the still image Ia is added to the table illustrated in FIG. 8 in S510. As a result, suppose that the number of the still images to be selected as candidates of the output target is 2, the still images of the frame numbers "4" and "68" which are two still images with higher evaluation scores will be selected in the table illustrated in FIG. 8 in S406.

According to the above embodiment, if the predetermined feature quantity of the frame in the moving image does not satisfy a level as the still image data, a subsequent frame with an interval of the number of frames (time) in accordance with the type of the feature quantity is analyzed additionally. Therefore, if time required to eliminate the factor about the feature quantity (closed-eyes, defocused state/shaking, etc.) differs depending on the type of the feature quantity, the frame which is a target of additional analysis can be specified with an appropriate frame interval.

In the above embodiment, regarding a certain frame, only one frame with a frame interval from that frame by the maximum offset among offsets corresponding to all feature quantities that do not satisfy a predetermined level (equal to or greater than a threshold) is additionally decoded and analyzed. However, a plurality of frames with a frame interval by an offset corresponding to each of all feature quantities that do not satisfy a predetermined level (equal to or greater than a threshold) may be additionally decoded and analyzed. For example, in a state determined to be Yes both in S701 and S703 in FIG. 7, two subsequent frames with the frame interval by the offset "3" and the offset "7" from the still image Ic may be additionally analyzed.

In the above embodiment, if the value of the feature quantity is less than a threshold, the offset to the frame to be additionally decoded and analyzed is determined depending on the type of the feature quantity. However, this configuration is not restrictive, and the number of frames to be additionally decoded and analyzed, or both the offset and the number of frames may be determined depending on the type of the feature quantity. In the above embodiment, the evaluation score Sc of the current target still image Ic is compared with the evaluation score Sa of the additionally decoded still image Ia, and the still image with a higher evaluation score will be selected. However, it is possible to constantly select Ia without making a comparison.

Third Embodiment

In the first embodiment, if a value of a feature quantity of a specific frame exceeds a predetermined threshold, a subsequent frame with a fixed frame interval in a moving image is additionally decoded and analyzed constantly. However, in the frame with the fixed frame interval, the value of the feature quantity is not necessarily smaller than the threshold. For example, in a case in which a person of an object closes the eyes in a certain frame due to blinking, a possibility that the person opens the eyes in a slightly later frame is high. However, if the person closes the eyes intentionally, the possibility becomes lower. In that case, additional decoding and analysis may become performed in vain. Then, in the third embodiment, an example in which if a value of a feature quantity of the specific frame exceeds a predetermined threshold, whether the value of the feature quantity in an already decoded subsequent frame is smaller than a threshold is checked in advance will be described. In the third embodiment, processes other than an offset determination process of an image to be additionally analyzed are the same as those of the first embodiment.

Figure 9:
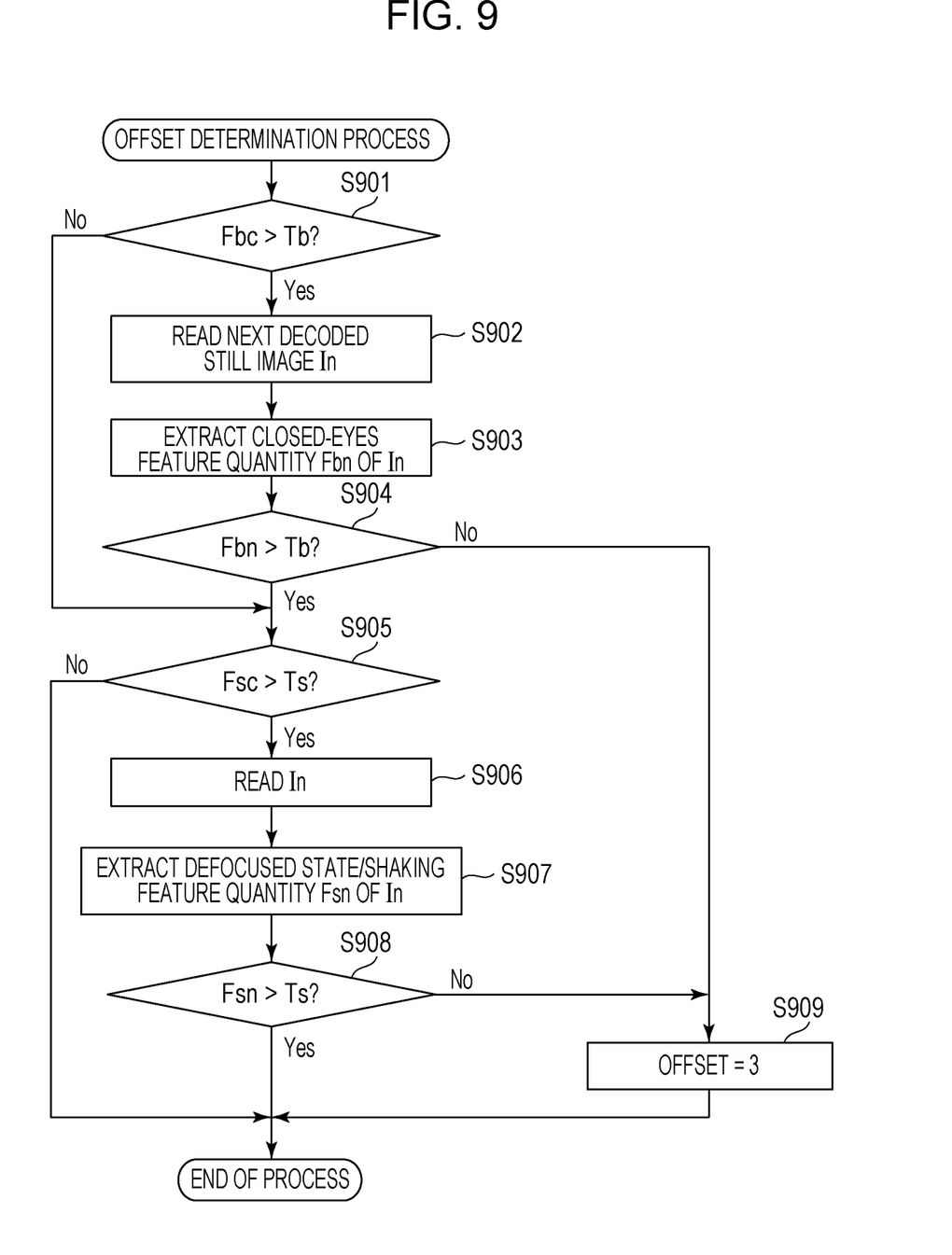
FIG. 9 is a flowchart illustrating an example of an offset determination process in a third embodiment.

FIG. 9 is a flowchart illustrating an example of the offset determination process in the third embodiment.

The additional image determination unit 206 determines whether the closed-eyes feature quantity Fbc of the current target still image Ic has exceeded the Tb (e.g., 0.6) in a list of decoded still images (I frames) illustrated in FIG. 3A (S901). As a result of the determination, if the closed-eyes feature quantity Fbc has not exceeded the Tb, the process proceeds to S905. As a result of the determination of S901, if the closed-eyes feature quantity Fbc has exceeded the Tb, the additional image determination unit 206 reads the subsequent decoded still image In of the still image Ic into the RAM 104 which is decoded in S402 of FIG. 4 (S902). In S402, the moving image decoding unit 202 has decoded the I frame every 30 frames in the moving image. Therefore, in S902, the subsequent I frame after 30 frames from the still image Ic in the moving image is read as the decoded still image In.

Next, the additional image determination unit 206 extracts the closed-eyes feature quantity Fbn of the still image In (S903), and determines whether the closed-eyes feature quantity Fbn has exceeded the threshold Tb (S904). If the closed-eyes feature quantity Fbn has not exceeded the threshold Tb, the additional image determination unit 206 sets the offset to 3 (S909), and completes the process. As a result of the determination of S904, if the closed-eyes feature quantity Fbn has exceeded the Tb, the additional image determination unit 206 determines whether the defocused state/shaking feature quantity Fsc of the current target still image Ic has exceeded the Ts (e.g., 0.5) (S905). As a result of the determination of S905, if the defocused state/shaking feature quantity Fsc has not exceeded the Ts, the additional image determination unit 206 completes the process illustrated in FIG. 9. As a result of the determination of S905, if the defocused state/shaking feature quantity Fsc has exceeded the Ts, the additional image determination unit 206 reads the decoded still image In into the RAM 104 (S906). The additional image determination unit 206 then extracts the defocused state/shaking feature quantity Fsn of the still image In (S907). The additional image determination unit 206 determines whether the defocused state/shaking feature quantity Fsn has exceeded the Ts (S908), and if the defocused state/shaking feature quantity Fsn has not exceeded the Ts, the additional image determination unit 206 sets the offset to 3 (S909) and completes the process illustrated in FIG. 9. As a result of the determination of S908, if the defocused state/shaking feature quantity Fsn has exceeded the Ts, the additional image determination unit 206 completes the process illustrated in FIG. 9.

That is, according to the process in FIG. 9, if closed-eyes occurs in the current target still image Ic (S901: Yes), whether closed-eyes occurs also in the decoded subsequent still image In is determined in S904. In a case in which closed-eyes occurs also in the decoded subsequent still image In (S904: Yes), if a determination result in S905 is No, the offset is not set to 3 but is still 0. That is, since the determination result in S505 of FIG. 5 is No, additional analysis of the frame is not performed between two frames of the still image Ic and the still image In in the moving image. For example, there is a case in which a person of an object of a moving image intentionally closes the eyes, and closes the eyes also in all the frames between the still image Ic and the still image In in the moving image. According to the process illustrated in FIG. 9, since the frames between the still image Ic and the still image In are not additionally analyzed, it can be prevented that frames are additionally analyzed in vain that the closed-eyes state has not been eliminated.

Similarly, according to the process in FIG. 9, if defocused state/shaking has occurred in the current target still image Ic (S905: Yes), whether defocused state/shaking has occurred also in the decoded subsequent still image In is determined in S908. If defocused state/shaking has occurred also in the decoded subsequent still image In (S908: Yes), the offset is not set to 3, but is still 0. That is, the determination result in S505 of FIG. 5 is No, additional analysis of the frame is not performed. Defocused state/shaking may occur also in all the frames between the still image Ic and the still image In in the moving image due to setting errors of imaging conditions at the time of capturing the moving image, for example. According to the process illustrated in FIG. 9, since the frames between the still image Ic and the still image In are not additionally analyzed, it can be prevented that frames are additionally analyzed in vain that the defocused state/shaking state has not been eliminated.

Fourth Embodiment

In the first embodiment, if a value of a feature quantity of a specific frame in a moving image exceeds a predetermined threshold, a subsequent frame with a fixed frame interval in the moving image is always additionally decoded and analyzed. However, an offset amount (time) required until the value of the feature quantity becomes high enough is not necessarily fixed, there may be a case in which a greater offset amount (time) than generally sufficient offset amount (time) is required before the value of the feature quantity becomes high enough. Then, in a fourth embodiment, an example in which if a value of a feature quantity has exceeded a threshold also in a frame after a predetermined offset, the offset is repeatedly added until the value of the feature quantity becomes smaller than the threshold will be described. In the fourth embodiment, processes other than an offset determination process for determining the offset to specify the still image to be additionally analyzed are the same as those of the first embodiment.

Figure 10:
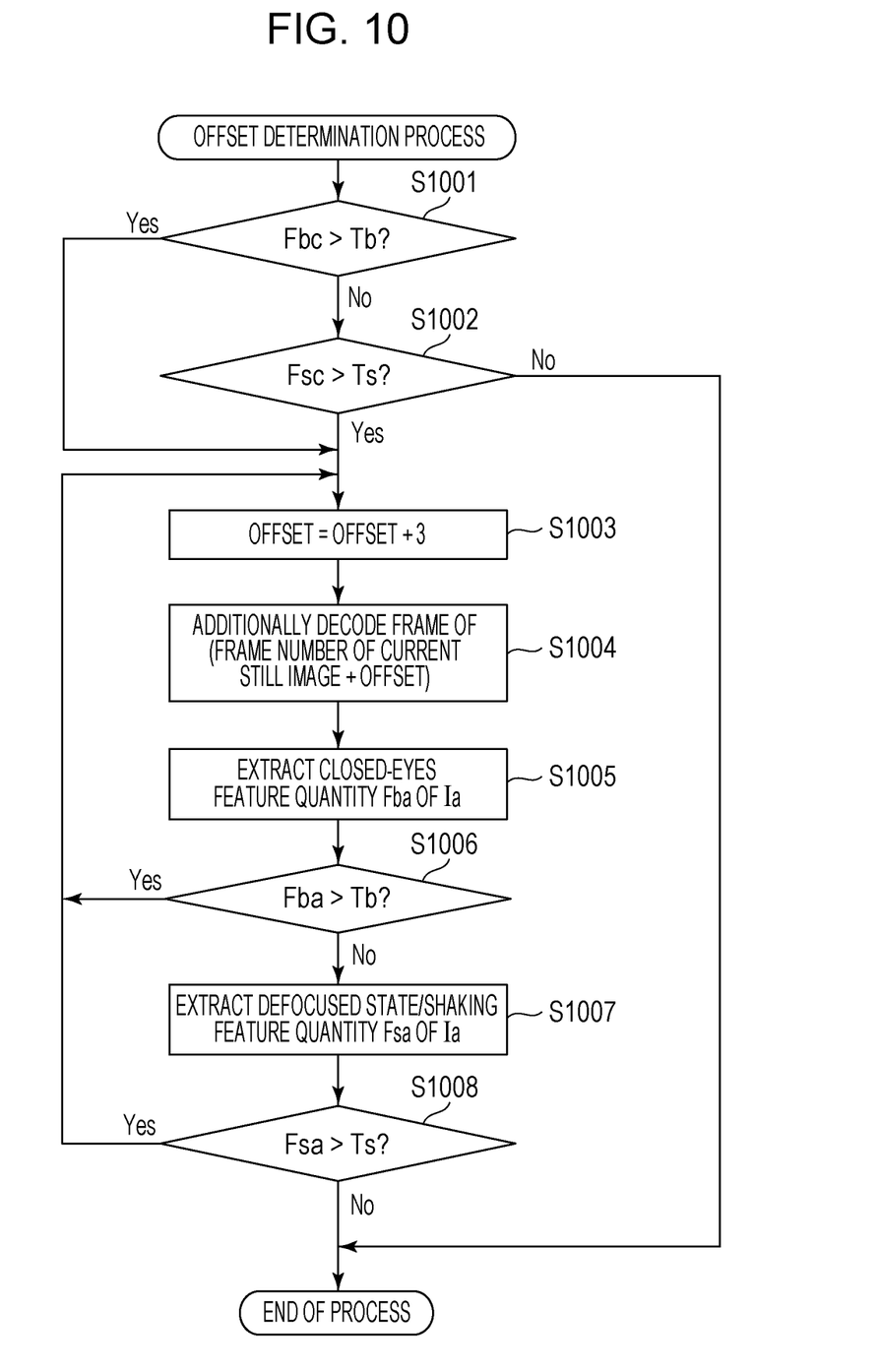
FIG. 10 is a flowchart illustrating an example of an offset determination process in a fourth embodiment.

FIG. 10 is a flowchart illustrating an example of the offset determination process in the fourth embodiment.

The additional image determination unit 206 determines whether the closed-eyes feature quantity Fbc of the current target still image Ic included in the list of the decoded still images shown in the table of FIG. 3A has exceeded the Tb (e.g., 0.6) (S1001). As a result of the determination of S1001, if the closed-eyes feature quantity Fbc has not exceeded the Tb, the additional image determination unit 206 determines whether the defocused state/shaking feature quantity Fsc of the still image Ic has exceeded the Ts (e.g., 0.5) (S1002). If the defocused state/shaking feature quantity Fsc has not exceeded the Ts, the additional image determination unit 206 completes the process illustrated in FIG. 10. If it is determined that the feature quantity has exceeded the threshold in the determination of either S1001 or S1002 (if the closed-eyes or the defocused state/shaking occurs in the still image Ic), the additional image determination unit 206 adds 3 to the current offset (S1003). The additional image determination unit 206 then additionally decodes a frame of a frame number to which an offset is added to the frame number corresponding to the current target still image Ic (S1004). Then the still image Ia generated by additionally decoding becomes a candidate of additional evaluation. The additional image determination unit 206 then extracts the closed-eyes feature quantity Fba of the still image Ia (S1005), and determines whether the closed-eyes feature quantity Fba has exceeded the Tb (S1006). As a determination result of S1006, if the closed-eyes feature quantity Fba has not exceeded the threshold Tb, the additional image determination unit 206 extracts the defocused state/shaking feature quantity Fsa of the still image Ia (S1007). The additional image determination unit 206 determines whether the defocused state/shaking feature quantity Fsa has exceeded the Ts (e.g., 0.5) (S1008). If the defocused state/shaking feature quantity Fsa has not exceeded the Ts, the additional image determination unit 206 completes the process illustrated in FIG. 10. If the feature quantity has exceeded the threshold in the determination of S1006 or S1008, the process returns to S1003. Then, a frame three frames later than the still image Ia which is a candidate of the current additional evaluation becomes a new candidate of additional evaluation.

According to the process illustrated in FIG. 10, if either of the closed-eyes feature quantity or the defocused state/shaking feature quantity of the current target still image Ic has exceeded a threshold (S1001 or S1002: Yes), the process of S1003 is executed. The frame of the candidate of the additional evaluation is specified until the frame of which neither the closed-eyes feature quantity nor the defocused state/shaking feature quantity exceeds the threshold is specified as a candidate of additional evaluation (both S1006 and S1008: No). Therefore, a favorable still image with a low degree of closed-eyes and a low degree of defocused state/shaking may reliably be specified as a candidate of additional evaluation.

Restriction may be provided on the offset value increased in S1003. Even if the offset is increased to the restriction, if a frame of which neither the closed-eyes feature quantity nor the defocused state/shaking feature quantity exceeds a threshold is not specified, the additional image determination unit 206 may set the offset to 0 and complete the process of FIG. 10. For example, when the offset value becomes 30, since the decoded subsequent frame is read in S402, restriction of "less than 30" may be provided as restriction of the offset value.

Only the I frames in the moving image are decoded in the above embodiment, however, the frames may be decoded for every certain period of time irrespective of being I frames. Further, the still image may be reduced and stored at the initial decoding, and only finally selected still images may finally be decoded as still images in the original size again. An example in which a frame in a moving image is decoded and analyzed whenever the process illustrated in FIG. 4 is executed is described with reference to FIG. 4, this is not restrictive. For example, if all the frames or only the I frames are decoded before the process illustrated in S402 of FIG. 4 is executed, in the determination process of the candidate frame, the decoding process does not necessarily have to be performed about the already decoded frames. In this case, only analysis may be performed about the already decoded frames. The closed-eyes feature quantity and the defocused state/shaking feature quantity are described in the above embodiment, however, the type and the number of feature quantities are not limited to the same.

In the above embodiments, an example in which a plurality of frames (e.g., a plurality of I frames) is decoded from a moving image is described. However, this example is not restrictive and, regarding one frame designated by a user, for example, whether it is necessary to additionally analyze other frames may be determined, and a candidate frame of a candidate of an output target may be selected from the additionally analyzed frame and the original frame.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-239740 filed Dec. 9, 2016, which is hereby incorporated by reference herein in its entirety.

What is claimed is:

1. An image processing apparatus which selects a frame from a moving image, comprising:
    a memory configured to store a program; and
    at least one processor configured to execute the program stored in the memory, wherein
    the at least one processor executes predetermined analysis to a first frame included in the moving image,
    the at least one processor determines whether or not to execute the predetermined analysis to a second frame which is included in the moving image and different from the first frame, based on a result of the predetermined analysis of the first frame, and in a case where the at least one processor executes the predetermined analysis to the second frame based on the determination, the at least one processor selects a frame from the first frame and the second frame, based on a result of the predetermined analysis to each of the first frame and the second frame.

2. The image processing apparatus according to claim 1, wherein the at least one processor determines the second frame based on the first frame.

3. The image processing apparatus according to claim 2, wherein the at least one processor specifies a plurality of first frames in the moving image, and the at least one processor executes the predetermined analysis to each of the plurality of specified first frames, and further executes the predetermined analysis to the second frame determined with respect to some of the first frames among the plurality of first frames, and wherein the at least one processor selects the frame from some of the first frames and the second frame.

4. The image processing apparatus according to claim 3, wherein the moving image includes a plurality of frames encoded using inter frame prediction, and a plurality of frames encoded without using the inter frame prediction, wherein the at least one processor specifies the frame encoded without using the inter frame prediction as the first frame, and wherein the at least one processor determines the frame encoded using the inter frame prediction as the second frame.

5. The image processing apparatus according to claim 3, wherein the at least one processor selects the frame from the first frame and the second frame, and selects a frame of an output target from some of the first frames for which the second frame is not determined among the plurality of first frames and the frame selected from the first frame and the second frame.

6. The image processing apparatus according to claim 1, wherein the at least one processor causes a display device to display an album in which a still image corresponding to the frame selected from the first frame and the second frame is arranged on a template.

7. The image processing apparatus according to claim 1, wherein the at least one processor causes a printing device to print an album in which a still image corresponding to the frame selected from the first frame and the second frame is arranged on a template.

8. The image processing apparatus according to claim 3, wherein when results of the predetermined analysis of both of the two specified first frames satisfy a predetermined condition, the at least one processor does not additionally execute the predetermined analysis to a frame between the two first frames in the moving image, and when only a result of the analysis of a previous frame in the two first frames satisfies the predetermined condition, the at least one processor executes the predetermined analysis to the second frame determined unit between the two first frames.

9. The image processing apparatus according to claim 2, wherein in a case where the result of the predetermined analysis of the first frame does not satisfy a predetermined condition, the at least one processor does not determine the second frame.

10. The image processing apparatus according to claim 1, wherein the at least one processor determines whether the result of the predetermined analysis of the frame included in the moving image satisfies a predetermined condition, wherein in a case where it is determined that the result satisfies the predetermined condition, the at least one processor executes the predetermined analysis to the second frame, and in a case where it is determined that the result does not satisfy the predetermined condition, the at least one processor executes the predetermined analysis to the second frame.

11. The image processing apparatus according to claim 10, wherein the predetermined analysis is analysis about predetermined feature quantity of an image.

12. The image processing apparatus according to claim 11, wherein the predetermined analysis includes a plurality of types of analysis about a plurality of types of feature quantities of the first frame, and wherein an analysis result of either of the plurality of types satisfies a predetermined condition, a different frame is determined as the second frame depending on the type of which the analysis result satisfies the predetermined condition.

13. The image processing apparatus according to claim 10, wherein the at least one processor determines whether an analysis result of the predetermined analysis of the second frame satisfies the predetermined condition, wherein in a case where it is not determined that the analysis result of the second frame does not satisfy the predetermined condition, a new second frame is determined, and wherein the selection unit selects a frame from the first frame and the new second frame.

14. The image processing apparatus according to claim 1, wherein the predetermined analysis is analysis about closed-eyes of a person included in a frame, or analysis about a defocused state or shaking in the frame.

15. An image processing method, executed by at least one processor, for selecting a frame from a moving image, comprising:

executing predetermined analysis to a first frame included in the moving image;

determining whether or not to execute the predetermined analysis to a second frame which is included in the moving image and different from the first frame, based on a result of the predetermined analysis of the first frame; and selecting, in a case where the at least one processor executes the predetermined analysis to the second frame based on the determination, a frame from the first frame and the second frame, based on a result of the predetermined analysis to each of the first frame and the second frame.

16. The image processing method according to claim 15, further comprising determining the second frame based on the first frame.

17. The image processing method according to claim 16, further comprising specifying a plurality of first frames in the moving image, wherein in the executing, the predetermined analysis is executed to each of the plurality of first frames specified in the specifying, and the predetermined analysis is executed to the second frame determined in the determining with respect to some of the first frames among the plurality of first frames, and wherein in the selecting, the frame is selected from some of the first frames and the second frame.

18. The image processing method according to claim 17, wherein
the moving image includes a plurality of frames encoded using inter frame prediction, and a plurality of frames encoded without using the inter frame prediction,
wherein in the specifying, the frame encoded without using the inter frame prediction is specified as the first frame, and
in the determining, the frame encoded using the inter frame prediction is determined as the second frame.

19. The image processing method according to claim 17, wherein in the selecting, the frame is selected from the first frame and the second frame, and a frame of an output target is selected from some of the first frames for which the second frame is not determined among the plurality of first frames and the frame selected from the first frame and the second frame.

20. A non-transitory storage medium storing a program which causes a computer to execute an image processing method, executed by at least one processor, for selecting a frame from a moving image,
the image processing method comprising:
executing predetermined analysis to a first frame included in the moving image;
determining whether or not to execute the predetermined analysis to a second frame which is included in the moving image and different from the first frame, based on a result of the predetermined analysis of the first frame; and
selecting, in a case where the at least one processor executes the predetermined analysis to the second frame based on the determination, a frame from the first frame and the second frame, based on a result of the predetermined analysis to each of the first frame and the second frame.

* * * * *